Nov. 25, 1924.
C. C. BRINCK
1,517,045
AUTOMOBILE DIRECTION SIGNAL
Filed April 19, 1923
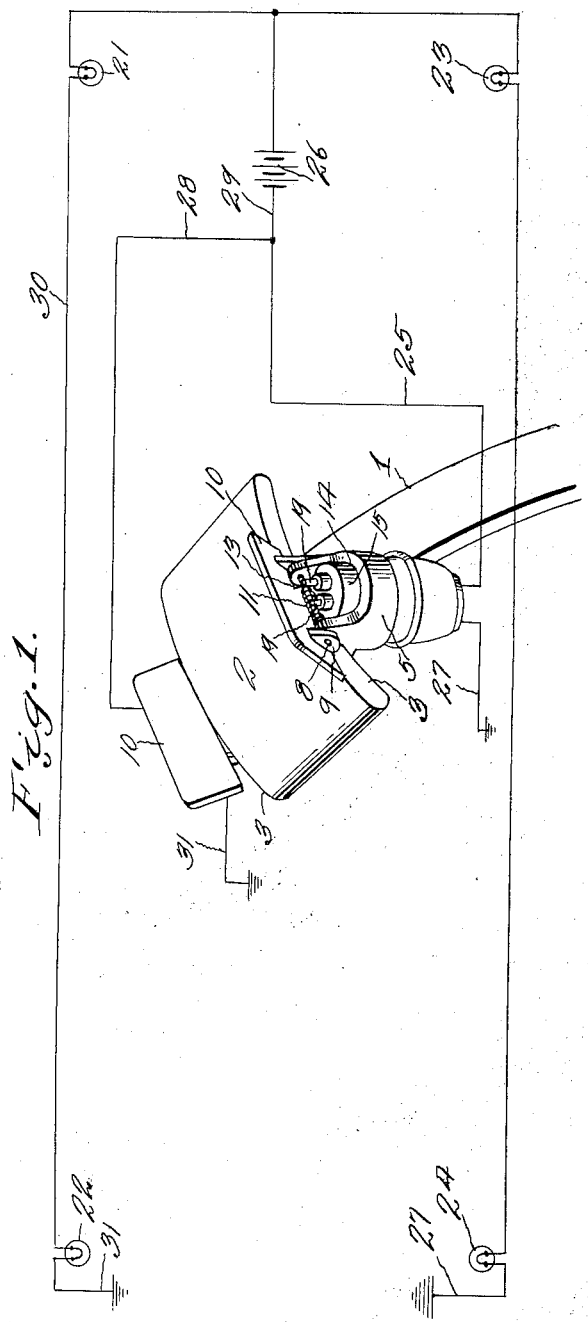
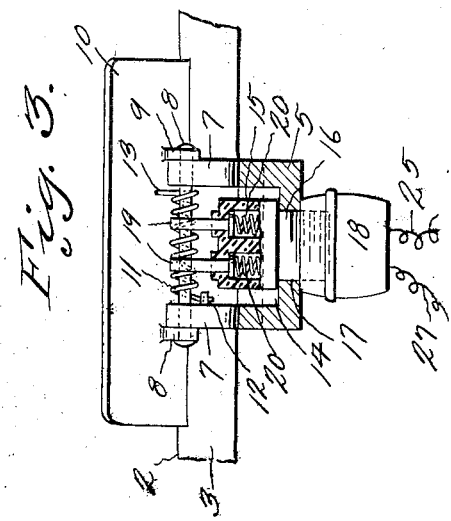
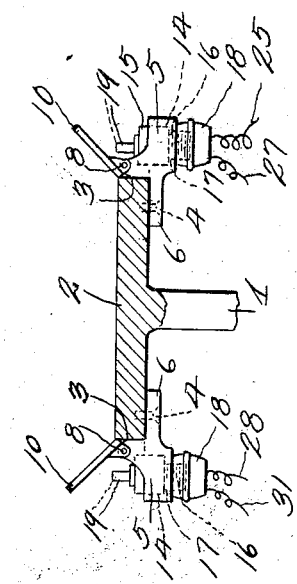
Inventor
Chester C. Brinck
By George J. Oltsch
Attorney Patented Nov. 25, 1924.

1,517,045

UNITED STATES PATENT OFFICE.

CHESTER C. BRINCK, OF MISHAWAKA, INDIANA.

AUTOMOBILE DIRECTION SIGNAL.

Application filed April 19, 1923. Serial No. 633,191.

*To all whom it may concern:*

Be it known that I, CHESTER C. BRINCK, a citizen of the United States, residing at Mishawaka, in the county of St. Joseph and State of Indiana, have invented certain new and useful Improvements in Automobile Direction Signals, of which the following is a specification.

The invention relates to automobile direction signals and has for its object to provide a device of this character wherein lights located at opposite sides of the vehicle, at the forward and rear ends thereof may be lighted and controlled by the foot of the operator disposed on a control lever of the automobile without removing his eyes from the road, or his hands from the steering wheel.

A further object is to provide upwardly and outwardly inclined plates at the opposite sides of the tread of the pedal, said plates being hingedly connected to switch supporting brackets secured to the tread, thereby allowing the operator to move downwardly either plate by a slight sideward movement of the foot for closing either light controlled circuit. Also to provide spring means for returning the plates to normal inoperative position when the foot is removed therefrom.

A further object is to provide the brackets with a switch having spring supported contact members with which the plates cooperate. The spring contact members form means whereby a positive contact is made upon the downward movement of the plates into engagement therewith.

A further object is to provide means whereby a conventional form of separable plug having spring supported contacts may be easily and quickly applied to the bracket.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a perspective view of a conventional form of foot pedal, showing the foot controlled switches applied thereto.

Figure 2 is a transverse sectional view through the pedal tread, showing the switches applied thereto.

Figure 3 is a side elevation of the device, part of the bracket being shown in section to better illustrate the structure.

Referring to the drawing, the numeral 1 designates a foot lever of the type used in connection with motor driven vehicles, which foot lever or pedal may control any part of the engine, for instance, it may be a clutch lever or a brake lever. The foot engaging portion 2 of the lever has secured to the opposite sides 3 thereof, by means of screws 4, brackets 5, said screws extending through the flanges 6 of the brackets, which flanges underlie the sides of the portion 2 of the pedal. Extending upwardly from the brackets 5 are spaced ears 7, to the upper ends of which are hingedly connected by means of rods 8, which pass through said ears 7 and ears 9 plate 10, which plates, when in inoperative position as shown in the drawing, extend upwardly and outwardly at an angle in relation to the portion 2 of the foot lever. By positioning the plates 10 at angles in relation to the pedal 2, it is obvious that when the operator desires to depress either plate, it will only be necessary for him to move the foot slightly to either side and by moving the foot in this manner, he will readily know when either plate 10 has been depressed without removing his eyes away from the roadway ahead of the vehicle. Plates 10 are normally held in inoperative position by means of coiled springs 11, which springs are disposed on the rods 8, and have one of their ends anchored at 12 to one of the ears 7 and their other ends 13 in engagement with the undersides of the plates 10. It will be seen that when the operator removes his foot from either plate, springs 11 will return the plates to normal inoperative position. However it will also be seen that the operator can operate either plate 10 or release the same by simply sliding his foot to either side of the portion 2 of the pedal, thereby obviating the necessity of raising the foot out of engagement with the pedal, as would be the case if conventional forms of push buttons were used.

The brackets 5 are provided with chambers 14, in which are disposed plugs 15, which plugs have their threaded reduced portions 16 extending through apertures 17 in the bottoms of the brackets and threaded into members 18. It will be seen that the plugs are of conventional forms and when the members 18 are threaded on the reduced portions 6, the plugs are securely held and secured to the brackets 5. By using a conventional form of electric plug, it is obvious that the cost of production is reduced to a minimum. Plugs 15 are provided with upwardly extending depressible contact members 19, which contact members are supported on springs 20, and are disposed beneath the plates 10. It will be seen that when the plates 10 are forced downwardly that they will engage the spring supported contact members 19, thereby closing circuits controlling the signal lights 21 and 22 for indicating a left turn, or the lights 23 and 24 for indicating a right turn. By providing spring supported contact members 19, a positive contact with the plates 10 is made, and the springs yieldably support the plates 10, no matter what position it assumes in its downward movement, consequently the contact between the members 19 and the plates 10 is positive at all times during a signalling operation.

The plugs 15 may be easily placed in position and removed, and the device may be easily and quickly applied to a pedal without materially altering the construction thereof. Contact members 19 at one side of the pedal are in circuit with the lamps 23 and 24 through the wires 25, battery 26 and ground wires 27. The contact members 19 at the opposite side of the pedal are in circuit with the lamps 21 and 22 through the wires 28, 29, battery 26, wire 30 and ground wires 31. It will be seen that the lamps at either side of the vehicle may be easily and quickly controlled.

From the above it will be seen that a control pedal of an automobile is provided with foot controlled switches, which switches are simple in construction, may be easily and quickly applied to a conventional form of pedal and constructed in such a manner whereby either control switch may be easily and quickly operated by the operator of the automobile without removing his eyes from the roadway or his foot from the pedal.

The invention having been set forth what is claimed as new and useful is:—

The combination with the tread of a foot controlling lever of an automobile, of a circuit maker and breaker, said circuit maker and breaker comprising a bracket having a chamber therein, a flange carried by said bracket and engaging the under side of the tread and secured thereto, an upwardly and outwardly extending hinged contact plate carried by the bracket and having its inner end normally registering with the side of the tread whereby a foot may be slid thereon while in contact with the tread, spring means for normally holding said contact plate in raised position, an electric plug disposed within the chamber of the bracket, said plug being provided with a reduced threaded portion extending through an aperture in the bottom of the bracket, a member threaded onto the threaded portion of the plug and yieldably supported contact members carried by the plug below the plate.

In testimony whereof I affix my signature.

CHESTER C. BRINCK.